US011530009B2

(12) United States Patent
Zwegers et al.

(10) Patent No.: US 11,530,009 B2
(45) Date of Patent: Dec. 20, 2022

(54) VEHICLE SELECTIVELY CONVERTIBLE TO A DUALLY CONFIGURATION

(71) Applicant: Toyota Motor Engineering & Manufacturing North America, Inc., Plano, TX (US)

(72) Inventors: Corey Zwegers, Dexter, MI (US); Robert C. MacArthur, Ypsilanti, MI (US); Claudia A. Ma, Northville, MI (US); Shigenori Shibata, Ann Arbor, MI (US); Adam R. VanAntwerp, Chelsea, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/319,190

(22) Filed: May 13, 2021

(65) Prior Publication Data
US 2022/0363327 A1  Nov. 17, 2022

(51) Int. Cl.
*B62D 61/12* (2006.01)
(52) U.S. Cl.
CPC ................... *B62D 61/12* (2013.01)
(58) Field of Classification Search
CPC .... B62D 61/12; B62D 61/125; B60C 23/001; B60C 23/008
See application file for complete search history.

(56) References Cited

U.S. PATENT DOCUMENTS 3,191,963 A    6/1965  Prichard
4,407,381 A *  10/1983 Oswald .................... E02F 9/02
                                                180/297
(Continued)

FOREIGN PATENT DOCUMENTS

CN        113103865 A  *  7/2021  ............. B60K 17/04
WO    WO-9907564 A1  *  2/1999  ............. B60B 15/26
(Continued)

OTHER PUBLICATIONS

Matthew Suedkamp, "What Is a Dually Truck?" 2 pages, last accessed on Feb. 8, 2021, found at https://itstillruns.com/dually-truck-6962287.html.
(Continued)

*Primary Examiner* — James A English
*Assistant Examiner* — Kurtis Nielson
(74) *Attorney, Agent, or Firm* — Christopher G. Darrow; Darrow Mustafa PC

(57) ABSTRACT

A vehicle can have: (1) a first pair of rear wheels with a first pair of tires configured to be able to bear a weight of the vehicle and (2) a second pair of rear wheels with a second pair of tires installed on the second pair of rear wheels and configured to be selectively inflatable. The first pair of wheels can be disposed on a first pair of axles. The second pair of wheels can be disposed on the first pair of axles or on a second axle. In an inflated state, the second pair of tires can be configured to be able to bear the weight of the vehicle. In a deflated state, the second pair of tires can lack being configured to bear the weight of the vehicle. An individual or a controller can cause the vehicle to have a conventional configuration or a dually configuration.

10 Claims, 4 Drawing Sheets

(56) References Cited

U.S. PATENT DOCUMENTS

| | | | | |
|---|---|---|---|---|
| 4,765,383 | A * | 8/1988 | Bott | B60C 23/002 |
| | | | | 152/416 |
| 4,842,302 | A * | 6/1989 | Lauronen | B62D 61/125 |
| | | | | 280/686 |
| 4,944,526 | A * | 7/1990 | Eberling | B62D 61/125 |
| | | | | 280/86.5 |
| 6,022,082 | A * | 2/2000 | O'Brien | B60B 15/263 |
| | | | | 301/41.1 |
| 6,478,387 | B1 * | 11/2002 | Rayman | B62D 55/24 |
| | | | | 301/36.3 |
| 6,615,888 | B2 * | 9/2003 | Elkow | B60B 11/04 |
| | | | | 152/344.1 |
| 6,637,834 | B2 * | 10/2003 | Elkow | B60B 11/00 |
| | | | | 301/36.1 |
| 10,639,946 | B2 | 5/2020 | Zaroor et al. | |
| 2010/0144220 | A1 | 6/2010 | Bailey | |
| 2017/0349009 | A1 | 12/2017 | Ehrlich | |
| 2018/0170344 | A1 * | 6/2018 | Laine | B60K 6/52 |
| 2020/0156431 | A1 | 5/2020 | Seo | |
| 2020/0361270 | A1 * | 11/2020 | Mochizuki | B62D 61/12 |
| 2021/0061005 | A1 * | 3/2021 | Galang | B60K 1/02 |
| 2021/0061095 | A1 * | 3/2021 | Galang | B60K 17/354 |
| 2021/0276222 | A1 * | 9/2021 | Datema | G01S 19/52 |

FOREIGN PATENT DOCUMENTS

| | | | | |
|---|---|---|---|---|
| WO | WO-0102196 | A1 * | 1/2001 | B60C 23/003 |
| WO | WO-2018213670 | A1 * | 11/2018 | B60C 23/003 |
| WO | WO-2019231373 | A1 * | 12/2019 | B60C 23/061 |
| WO | WO-2020116298 | A1 * | 6/2020 | |
| WO | 2020163832 | A1 | 8/2020 | |

OTHER PUBLICATIONS

Jim Park, "Exploring the world of 6×2 drive axles," Fuel Smarts, Trucking Info, 11 pages, Mar. 21, 2016, found at https://www.truckinginfo.com/156646/exploring-the-world-of-6x2-drive-axles.
Unknown, "Pickup truck," 7 pages, last accessed on Apr. 5, 2021 found at https://en.wikipedia.org/wiki/Pickup_truck.

* cited by examiner

VEHICLE SELECTIVELY CONVERTIBLE TO A DUALLY CONFIGURATION

TECHNICAL FIELD

The disclosed technologies are directed to a vehicle selectively convertible to a dually configuration.

BACKGROUND

A pickup truck is a type of vehicle that can be characterized by an open cargo area enclosed by low sides and a tailgate door. Because a volume of cargo capable of being transported by a pickup truck can be larger than a volume of cargo capable of being transported by a conventional automobile, pickup trucks have found favor with tradespeople, rural workers, sports enthusiasts, small business owners, and others. The introduction of creature comforts into the design of pickup trucks has allowed pickup trucks to be used both as conventional passenger vehicles and as trucks. Different designs of pickup trucks can be differentiated based on one or more of size, cargo weight limitations, towing capability, or the like. One design approach to increase a cargo weight limitation for a pickup truck can be to include a second pair of rear wheels so that the pickup truck has six wheels in total. Such a vehicle can be referred to as a dual rear wheel truck or, more commonly, as a dually truck.

SUMMARY

A vehicle can include a first pair of rear wheels and a second pair of rear wheels. The first pair of rear wheels can have a first pair of tires. The first pair of tires can be configured to be able to bear a weight of the vehicle. The second pair of rear wheels can have a second pair of tires. The second pair of tires can be installed on the second pair of rear wheels. The second pair of tires can be configured to be selectively inflatable. In an inflated state, the second pair of tires can be configured to be able to bear the weight of the vehicle. In a deflated state, the second pair of tires can lack being configured to bear the weight of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

One design approach to increase a cargo weight limitation for a pickup truck can be to include a second pair of rear wheels so that the pickup truck has six wheels in total. Such a vehicle can be referred to as a dual rear wheel truck or, more commonly, as a dually truck. Fortunately, a stability of a dually truck can be greater than a stability of a conventional pickup truck. Additionally, a towing capability of a dually truck can be greater than a towing capability of a conventional pickup truck. Unfortunately, a fuel use efficiency of a dually truck can be less than a fuel use efficiency of a conventional pickup truck. Also, a turning radius of a dually truck can be larger than a turning radius of a conventional pickup truck.

The disclosed technologies are directed to a vehicle selectively convertible to a dually configuration. A vehicle that incorporates the disclosed technologies can allow an individual associated with the vehicle to select to cause the vehicle to have a conventional configuration (i.e., one pair of rear wheels able to bear a weight of the vehicle) or to cause the vehicle to have a dually configuration (i.e., two pairs of rear wheels able to bear the weight of the vehicle).

Figure 1:
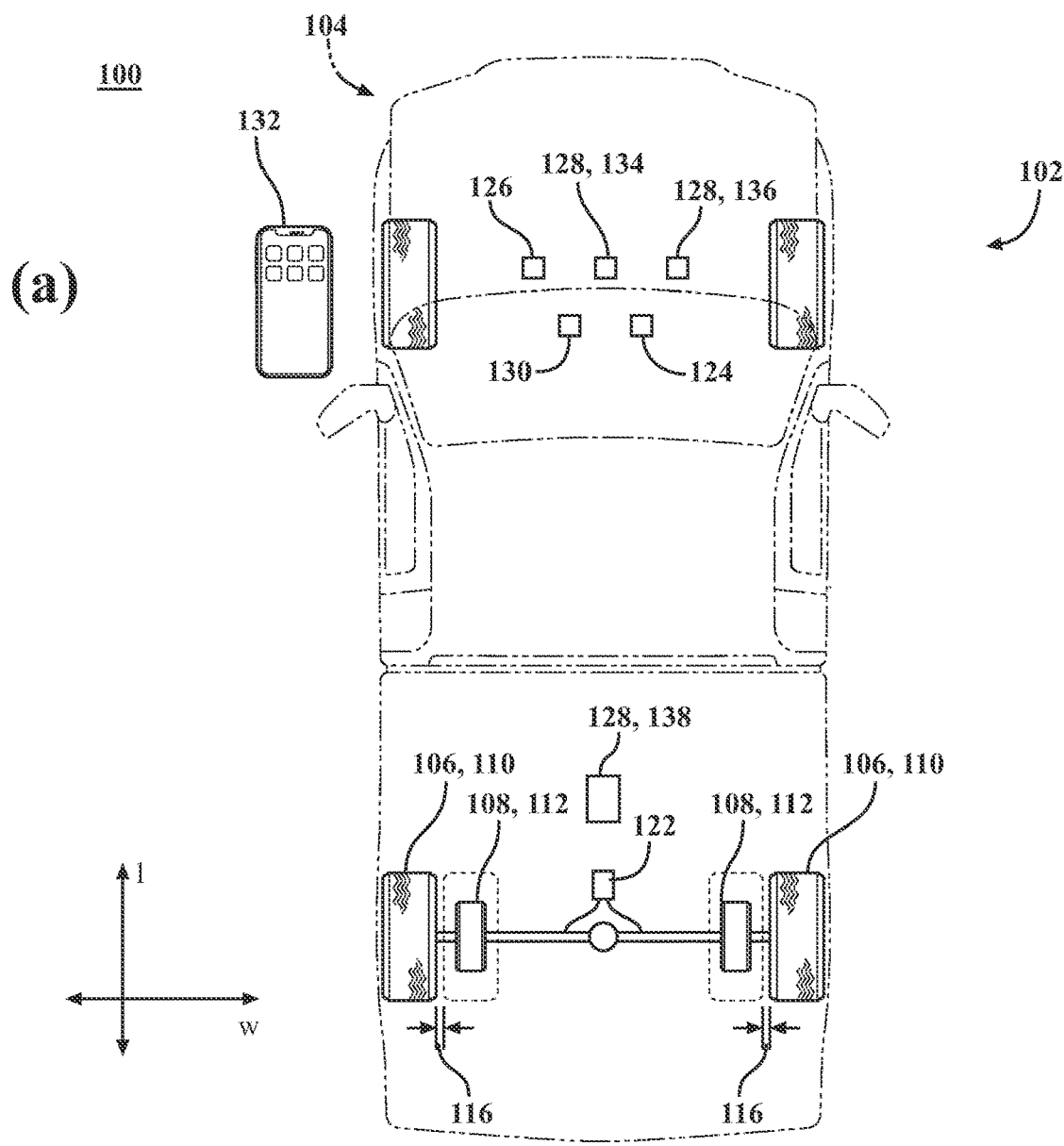
FIG. 1 includes diagrams that illustrate an example of an environment of a first configuration of a vehicle, according to the disclosed technologies.
Figure 1:
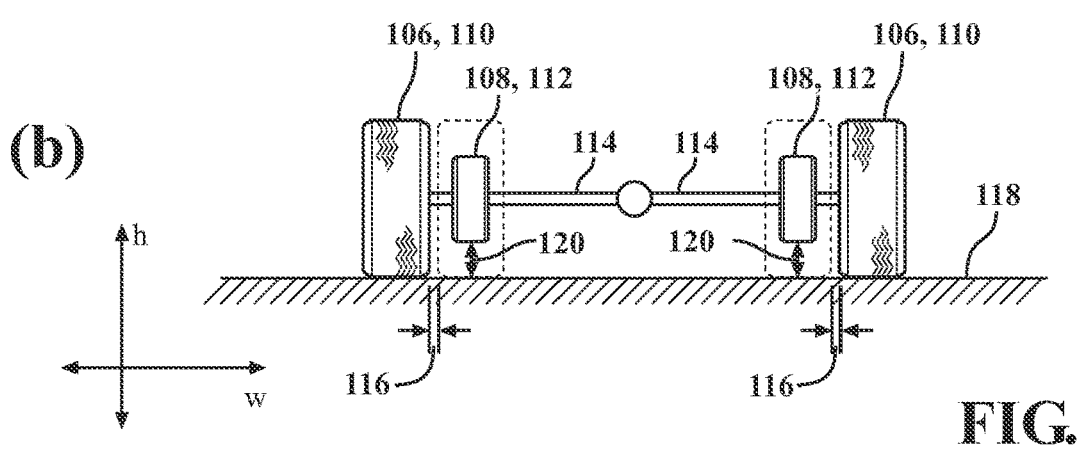

FIG. 1 includes diagrams that illustrate an example of an environment 100 of a first configuration 102 of a vehicle 104, according to the disclosed technologies. A view (a) of FIG. 1 is a diagram of the vehicle 104 from a perspective of a length-width (l-w) coordinate system. A view (b) of FIG. 1 is a diagram of the vehicle 104 from a perspective of a height-width (h-w) coordinate system.

The vehicle 104 can include, for example, a first pair of rear wheels 106 and a second pair of rear wheels 108. The first pair of rear wheels 106 can have a first pair of tires 110. The first pair of tires 110 can be configured to be able to bear a weight of the vehicle 104. The second pair of rear wheels 108 can have a second pair of tires 112. The second pair of tires 112 can be installed on the second pair of rear wheels 108. The second pair of tires 112 can be configured to be selectively inflatable. In an inflated state, the second pair of tires 112 can be configured to be able to bear the weight of the vehicle 104. In a deflated state, the second pair of tires 112 can lack being configured to bear the weight of the vehicle 104.

In the first configuration 102, the first pair of rear wheels 106 and the second pair of rear wheels 108 can be disposed on a pair of axles 114. In the first configuration 102, the second pair of rear wheels 108 can be disposed inside of the first pair of rear wheels 106. Additionally, for example, in the inflated state, the second pair of tires 112 can lack being in contact with the first pair of tires 110. For example, in the inflated state, there can be a space 116 of at least one half inch between a tire of the second pair of tires 112 and a corresponding tire of the first pair of tires 110.

For example, a stability of the vehicle 104 in the inflated state can be greater than the stability of the vehicle 104 in the deflated state. For example, a cargo weight limitation of the vehicle 104 in the inflated state can be greater than the cargo weight limitation of the vehicle 104 in the deflated state. For example, a towing capability of the vehicle 104 in the inflated state can be greater than the towing capability of the vehicle 104 in the deflated state. For example, a fuel use efficiency of the vehicle 104 in the deflated state can be greater than the fuel use efficiency of the vehicle 104 in the inflated state. For example, a turning radius of the vehicle 104 in the deflated state can be smaller than the turning radius of the vehicle 104 in the inflated state.

Additionally, for example, in the deflated state, the second pair of tires 112 can lack being in contact with a road 118. For example, in the deflated state, there can be a space 120 of at least three inches between a tire of the second pair of tires 112 and the road 118.

Additionally, for example, the vehicle 104 can further include an air pump 122. For example, the air pump 122 can be disposed on the vehicle 104. The air pump 122 can be configured to cause the second pair of tires 112 to be in the inflated state. For example, hoses or other conduits (not illustrated) can be connected between the air pump 122 and each tire of the second pair of tires 112. For example, a portion of the hoses or the other conduits can be disposed within the pair of axles 114.

Additionally, for example, the air pump 122 can be configured to cause the second pair of tires 112 to be in the deflated state. For example, the air pump 122 can be configured to produce a vacuum to increase a difference in pressure between air in the second pair of tires 112, in the inflated state, and an atmospheric pressure.

Additionally, for example, the vehicle 104 can further include a controller 124 and one or more of a communications device 126 or a sensor 128. The controller 124 can be configured to control, in response to a receipt of a signal, an operation of the air pump 122.

For example, the communications device 126 can be configured to: (1) receive information and (2) cause, in response to a receipt of the information, the signal to be conveyed to the controller 124. For example, the information can be indicative of a desire of an individual associated with the vehicle 104 to cause the second pair of tires 112 to be one of inflated or deflated.

For example, the vehicle 104 can further include an interface 130. The interface 130 can be communicably coupled to the communications device 126. For example, the interface 130 can be disposed on a dashboard of the vehicle 104, a central console of the vehicle 104, or the like. For example, the interface 130 can be a button disposed on the dashboard, the central console, or the like.

For example, the environment 100 can further include a mobile device 132. The mobile device 132 can be configured to be communicably coupled to the communications device 126.

For example, the sensor 128 can be configured to: (1) detect a condition and (2) cause, in response to a detection of the condition, the signal to be conveyed to the controller 124. The condition can be one or more of: (1) a measure of a stability of the vehicle 104 being outside a threshold range of measurements, (2) a measure of a cargo weight of the vehicle 104 being greater than a threshold cargo weight, or (3) the like.

For example, the sensor 128 can include one or more of an accelerometer 134, a gyroscope 136, or the like. For example, the measure of stability of the vehicle 104 can be determined from a measure of a sideslip, a measure of a yaw rate, or the like. For example, the sideslip can be estimated with the accelerometer 134 and the gyroscope 136. For example, the yaw rate can be estimated with the gyroscope 136.

For example, the sensor 128 can include a scale 138. For example, the scale 138 can be disposed in a bed of an open cargo area of the vehicle 104, under the bed of the open cargo area of the vehicle 104, or the like. For example, the measure of the cargo weight of the vehicle 104 can be determined by the scale 138.

Figure 2:
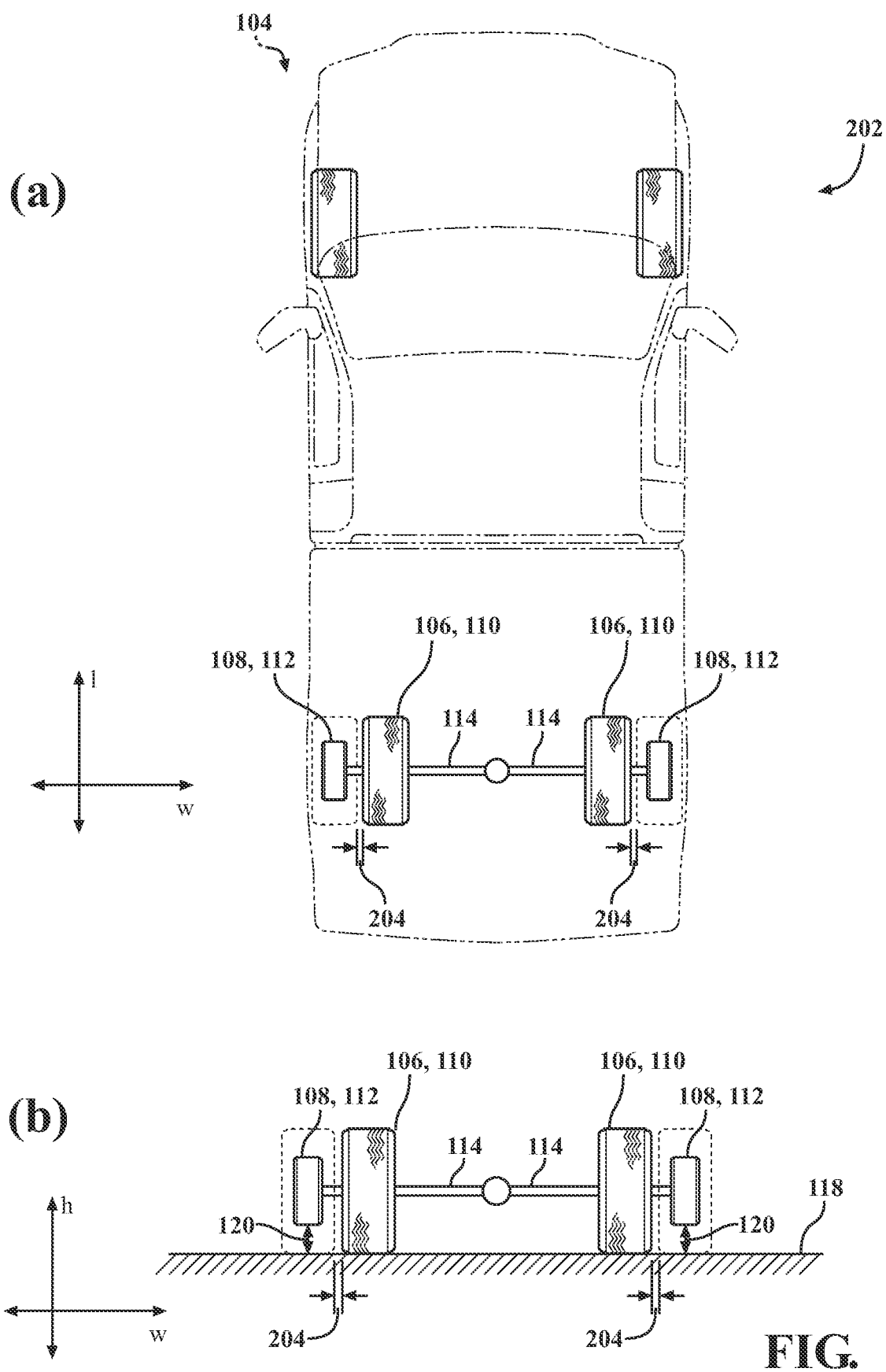
FIG. 2 includes diagrams that illustrates an example of a second configuration of the vehicle, according to the disclosed technologies.

FIG. 2 includes diagrams that illustrates an example of a second configuration 202 of the vehicle 104, according to the disclosed technologies. A view (a) of FIG. 2 is a diagram of the vehicle 104 from the perspective of the length-width (l-w) coordinate system. A view (b) of FIG. 2 is a diagram of the vehicle 104 from the perspective of the height-width (h-w) coordinate system.

In the second configuration 202, the first pair of rear wheels 106 and the second pair of rear wheels 108 can be disposed on the pair of axles 114. In the second configuration 202, the second pair of rear wheels 108 can be disposed outside of the first pair of rear wheels 106. Additionally, for example, in the inflated state, the second pair of tires 112 can lack being in contact with the first pair of tires 110. For example, in the inflated state, there can be a space 204 of at least one half inch between a tire of the second pair of tires 112 and a corresponding tire of the first pair of tires 110.

Figure 3:
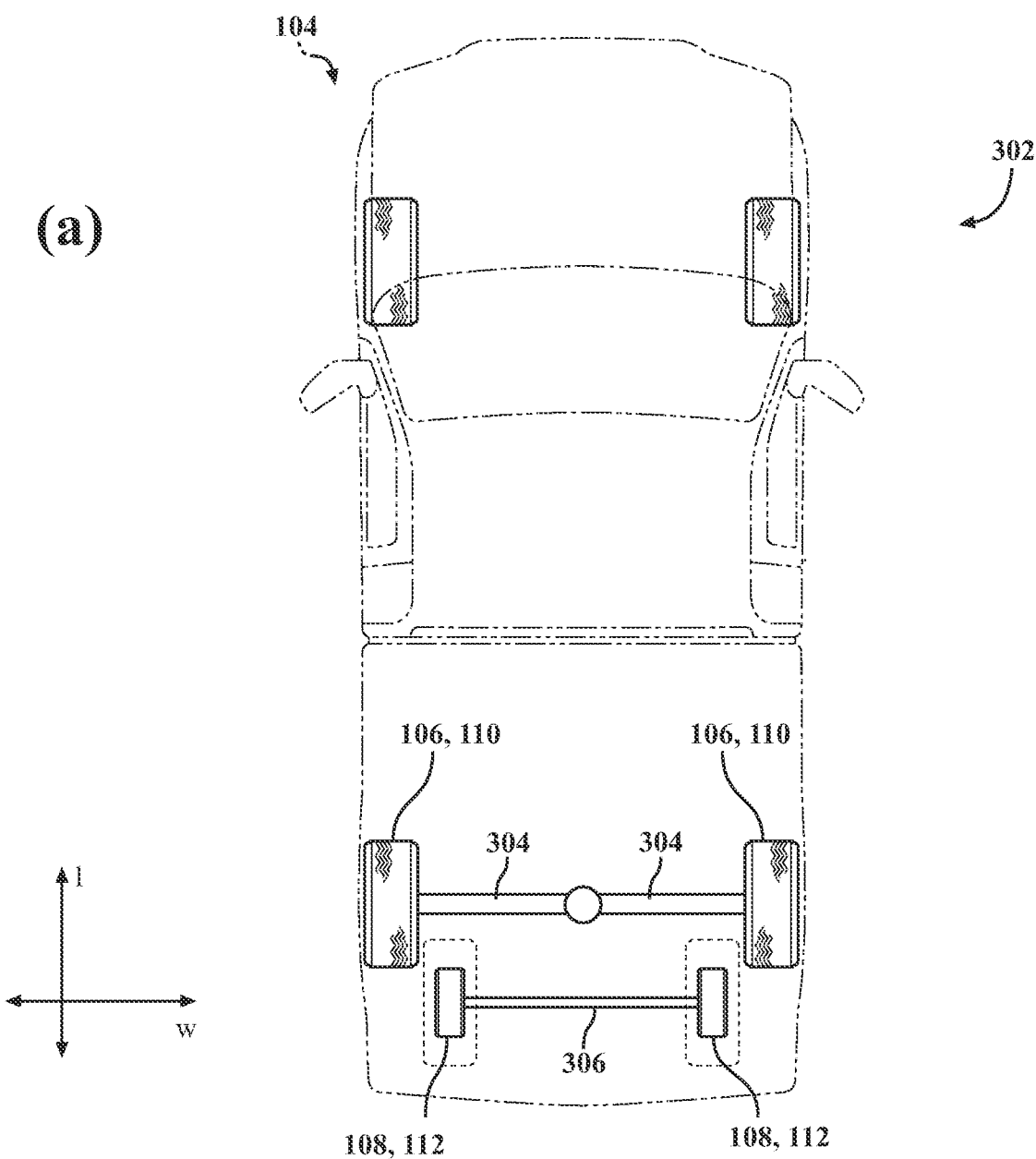
FIG. 3 includes diagrams that illustrates an example of a third configuration of the vehicle, according to the disclosed technologies.
Figure 3:
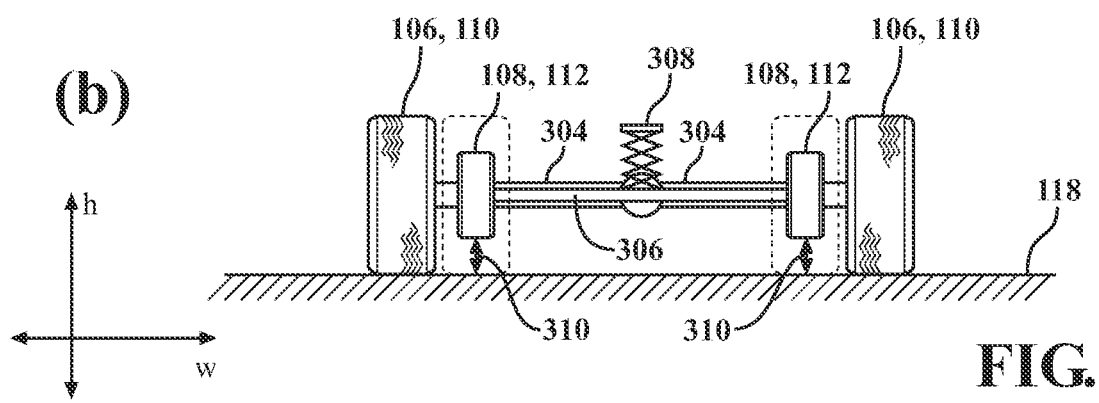

FIG. 3 includes diagrams that illustrates an example of a third configuration 302 of the vehicle 104, according to the disclosed technologies. A view (a) of FIG. 3 is a diagram of the vehicle 104 from the perspective of the length-width (l-w) coordinate system. A view (b) of FIG. 3 is a diagram of the vehicle 104 from the perspective of the height-width (h-w) coordinate system.

In the third configuration 302: (1) the first pair of rear wheels 106 can be disposed on a first pair of axles 304 and (2) the second pair of rear wheels 108 can be disposed on a second axle 306. Advantageously, in the third configuration 302, because a weight of a cargo can be distributed between the first pair of axles 304 and the second axle 306, a degree of wear of a suspension system for the vehicle 104 in the third configuration 302 can be less than the degree of wear of the suspension system for the vehicle 104 in the first configuration 102 or the second configuration 202.

In a first variation of the third configuration 302, the vehicle 104 can further include a device 308 configured to change a vertical position of the second axle 306. For example, the device 308 can be a powered arm or the like. For example, the second axle 306 can be a retractable axle, a lift axle, a drop axle, or the like. In a lowered state of the second axle 306 (not illustrated), the second pair of tires 112 can be configured to be able to bear the weight of the vehicle 104. In a raised state of the second axle 306, the second pair of tires 112 can lack being configured to bear the weight of the vehicle 104. For example, in the raised state, there can be a space 310 of at least one foot between a tire of the second pair of tires 112 and the road 118.

Figure 4:
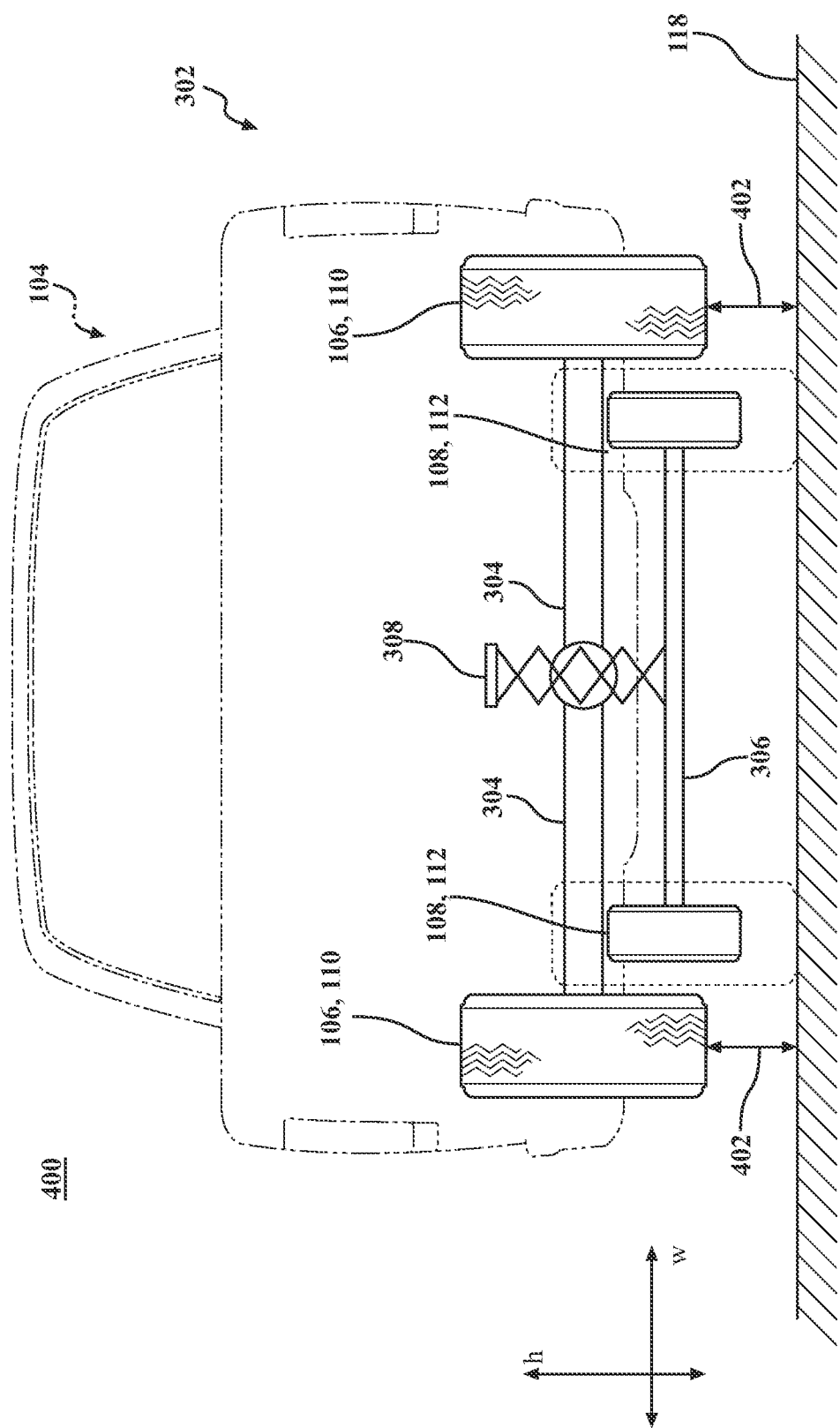
FIG. 4 includes a diagram that illustrates an example of a variation of the third configuration of the vehicle, according to the disclosed technologies.

FIG. 4 includes a diagram that illustrates an example of a second variation 400 of the third configuration 302 of the vehicle 104, according to the disclosed technologies. The diagram of the vehicle 104 is from the perspective of the height-width (h-w) coordinate system. In the second variation 400 of the third configuration 302, the lowered state can include a first lowered state and a second lowered state. In the first lowered state (not illustrated), the first pair of tires 110 can be configured to be able to bear the weight of the vehicle 104. In the second lowered state, the first pair of tires 110 can lack being configured to bear the weight of the vehicle 104. For example, in the second lowered state, there can be a space 402 of at least one foot between a tire of the first pair of tires 110 and the road 118. For example, in an event in which a tire of the first pair of tires 110 becomes damaged (e.g., a flat tire) and the vehicle 104 is a frontwheel drive vehicle or an all-wheel drive vehicle, the second lowered state can allow the vehicle 104 to continue to be in a drivable state.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-4, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle, comprising:
   a first pair of rear wheels having a first pair of tires configured to be able to bear a weight of the vehicle;

a second pair of rear wheels having a second pair of tires installed on the second pair of rear wheels, the second pair of tires configured to be selectively inflatable, wherein:
in an inflated state, the second pair of tires is configured to be able to bear the weight of the vehicle, and
in a deflated state, the second pair of tires lacks being configured to bear the weight of the vehicle; and
an air pump disposed on the vehicle and configured to cause the second pair of tires to be in the inflated state;
a controller configured to control, in response to a receipt of a signal, an operation of the air pump; and
a sensor configured to:
detect a condition, the condition being a measure of a stability of the vehicle being outside a threshold range of measurements, the measure of the stability being determined from at least one of a measure of a sideslip or a measure of a yaw rate; and
cause, in response to a detection of the condition, the signal to be conveyed to the controller.

2. The vehicle of claim 1, wherein in the deflated state, the second pair of tires lacks being in contact with a road.

3. The vehicle of claim 1, wherein the air pump is further configured to cause the second pair of tires to be in the deflated state.

4. The vehicle of claim 1, further comprising a communications device configured to:
receive information; and
cause, in response to a receipt of the information, the signal to be conveyed to the controller.

5. The vehicle of claim 1, wherein the second pair of rear wheels are disposed one of:
inside of the first pair of rear wheels, or
outside of the first pair of rear wheels.

6. The vehicle of claim 5, wherein in the inflated state, the second pair of tires lacks being in contact with the first pair of tires.

7. The vehicle of claim 1, wherein:
the first pair of rear wheels is disposed on a first pair of axles, and
the second pair of rear wheels is disposed on a second axle.

8. The vehicle of claim 7, further comprising a device configured to change a vertical position of the second axle, wherein:
in a lowered state of the second axle, the second pair of tires is configured to be able to bear the weight of the vehicle, and
in a raised state of the second axle, the second pair of tires lacks being configured to bear the weight of the vehicle.

9. The vehicle of claim 1, wherein the condition further is a measure of a cargo weight of the vehicle being greater than a threshold cargo weight.

10. A vehicle, comprising:
a first pair of rear wheels disposed on a first axle, the first pair of rear wheels having a first pair of tires configured to be able to bear a weight of the vehicle;
a second pair of rear wheels disposed on a second axle, the second pair of rear wheels having a second pair of tires installed on the second pair of rear wheels, the second pair of tires configured to be selectively inflatable, wherein:
in an inflated state, the second pair of tires is configured to be able to bear the weight of the vehicle, and
in a deflated state, the second pair of tires lacks being configured to bear the weight of the vehicle; and
a device configured to change a vertical position of the second axle, wherein:
in a raised state of the second axle, the second pair of tires lacks being configured to bear the weight of the vehicle,
in a first lowered state of the second axle, the second pair of tires and the first pair of tires are configured to be able to bear the weight of the vehicle,
in a second lowered state of the second axle, the second pair of tires is configured to be able to bear the weight of the vehicle, but the first pair of tires lacks being configured to bear the weight of the vehicle, and
the vertical position of the second axle in the first lowered state is different from the vertical position of the second axle in the second lowered state.

\* \* \* \* \*